UNITED STATES PATENT OFFICE.

JOSEF STRASBURGER, OF MOSCOW, RUSSIA, ASSIGNOR TO THE ACTIEN-GESELLSCHAFT FÜR ANILIN FABRIKATION, OF BERLIN, GERMANY.

PROCESS OF MAKING A BROWN DYE.

SPECIFICATION forming part of Letters Patent No. 399,581, dated March 12, 1889.

Application filed November 7, 1888. Serial No. 290,244. (No specimens.) Patented in Germany June 22, 1888, No. 1,939, and July 14, 1888, No. 1,950; in England July 23, 1888, No. 10,653; in Russia July 30, 1888, No. 7,802; in France August 10, 1888, No. 179,276; in Austria-Hungary August 10, 1888, No. 7,340, and in Italy September 30, 1888, XXII, 23,899, XLVII, 206.

*To all whom it may concern:*

Be it known that I, JOSEF STRASBURGER, of Moscow, in the Russian Empire, have invented new and useful Improvements in the Production of Brown Coloring-Matter which Dyes Cotton without the Use of a Mordant, (for which I have obtained Letters Patent in Italy, September 30, 1888, Vol. XXII, No. 23,899, and Vol. XLVII, No. 206, and for which I have made applications in Germany, June 22, 1888, No. A 1,939, and July 14, 1888, No. A 1,950; England, July 23, 1888, No. 10,653; France, August 10, 1888, No. 179,276; Russia, July 30, 1888, No. 7,802; Austria-Hungary, August 10, 1888, No. R 7,340;) and I do hereby declare that the following is a full, clear, and exact description of the invention, which will enable others skilled in the art to which it appertains to make and use the same.

It is well known that an orange coloring-matter is obtained by combining tetrazo-diphenyl (from benzidine) first with one molecule of salicylic acid and acting with the thus-formed intermediate product upon one molecule of resorcin. Now I have found that this coloring-matter is still able to combine with a further molecule of a diazo compound. By this reaction new coloring-matters are obtained which dye on cotton brown shades without the use of a mordant.

*Example* I.—Forty-seven kilos of the coloring-matter from tetrazo-diphenyl, salicylic acid, and resorcin are dissolved in four thousand liters of boiling water, with an addition of twenty-five kilos of caustic soda, (of 40° Baumé.) After cooling, twenty kilos of para-diazobenzole-sulphonic acid, suspended in about six hundred liters of water, are slowly entered into the alkaline solution. Thus a coloring-matter is obtained which is soluble with difficulty in water. Its precipitation is completed by adding a solution of common salt. It dyes cotton in deep brown shades without the use of a mordant. An identical coloring-matter is obtained if the intermediate product formed by one molecule of tetrazo-diphenyl and one molecule salicylic acid acts upon the coloring-matter formed by one molecule paradiazobenzole-sulphonic acid and one molecule resorcin.

To produce the new coloring-matter by this method, thirty-six kilos of the coloring-matter from paradiazobenzole-sulphonic acid and resorcin are dissolved in one thousand liters of water, and to this solution an equivalent quantity of the intermediate product from tetrazo-diphenyl and salicylic acid is added. To prepare the intermediate products, 18.5 kilos of benzidine are dissolved by means of forty-eight kilos of muriatic acid in eight hundred liters of water and diazotized by 13.8 kilos of nitrite of soda. The solution of the diazo compound is then entered into a solution of fifteen kilos of salicylic acid, fourteen kilos of caustic soda, (of 40° Baumé,) and thirty kilos of carbonate of soda in twelve hundred liters of water. After the mixture of the intermediate product and the above-mentioned coloring-matter has stood for about twenty-four hours, it is heated, and the so-formed coloring-matter precipitated by common salt, filtered, pressed, and dried. It dyes on cotton deep yellow-brown shades without the use of a mordant. If in example I the paradiazobenzole-sulphonic acid is replaced by metadiazobenzole-sulphonic acid, the resulting coloring-matter dyes more yellowish-brown shades.

*Example* II.—If in the first method of example I the paradiazobenzole-sulphonic acid is replaced by twenty-five kilos of alpha-naphthylamine-monosulphonic acid, a coloring-matter is obtained which dyes cotton red-brown. An identical coloring-matter is formed if the intermediate product from tetrazo-diphenyl and salicylic acid acts upon the coloring-matter from alpha-diazonaphthaline-monosulphonic acid and resorcin. The production of the latter compound requires 22.3 kilos of alpha-naphthylamine-monosulphonic acid, five hundred liters of water, fourteen kilos of muriatic acid, and 6.9 kilos of nitrite of sodium. The diazo compound thus formed is entered into a solution of 11.5 kilos of resorcin, twenty-six kilos of caustic soda, (of 40° Baumé,) and 7.5 kilos of carbonate of sodium in three hundred liters of water.

The different isomeric alpha-diazonaphthaline-monosulphonic acids show in regard to the described reaction an analogous behavior, and the corresponding coloring-matters do not differ very much in regard to their shades in dyeing cotton with them.

If the diazonaphthaline-monosulphonic acids are replaced by the disulphonic acids of the naphthaline, no remarkable variation regarding their shades is observed. The isomeric sulphonic acids of the beta-diazonaphthaline, if employed instead of the alpha-diazonaphthaline-sulphonic acids in the described reactions, yield coloring-matters which dye cotton more of a yellow-brown. Coloring-matters of similar shades are also obtained if the mono or disulphonic acids of diazoazobenzole or diazoazo-toluol are employed instead of the diazonaphthaline-sulphonic acids. Finally, it may be stated that in each of the described combinations the tetrazo-diphenyl may be replaced by tetrazo-ditolyl without any important change of the effect.

I claim—

1. The process herein described of producing coloring-matter for dyeing, the same consisting, first, in combining tetrazo-diphenyl with one molecule of salicylic acid, then combining with the product one molecule of resorcin, and finally combining with the product a diazobenzole-sulphonic acid and precipitating the dye or color, substantially as specified.

2. The process herein described of producing coloring-matter for dyeing, the same consisting in treating resorcin with paradiazobenzole-sulphonic acid, then dissolving the product in water, then adding to the solution the product obtained by the reaction of tetrazo-diphenyl with salicylic acid, then allowing the mixture to stand a suitable period of time, and then heating it and adding common salt, by which the coloring-matter is precipitated, which is finally filtered, pressed, and dried, substantially as specified.

JOSEF STRASBURGER.

Witnesses:
C. M. WERLE,
E. C. DUFFY.